US011847602B2

(12) United States Patent
Sharma et al.

(10) Patent No.: US 11,847,602 B2
(45) Date of Patent: Dec. 19, 2023

(54) SYSTEM AND METHOD FOR DETERMINING AND UTILIZING REPEATED CONVERSATIONS IN CONTACT CENTER QUALITY PROCESSES

(71) Applicant: NICE LTD., Ra'anana (IL)

(72) Inventors: Harshit Sharma, Maharashtra (IN); Rahul Vyas, Rajasthan (IN); Salil Dhawan, Maharashtra (IN)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 17/313,013

(22) Filed: May 6, 2021

(65) Prior Publication Data

US 2022/0358439 A1  Nov. 10, 2022

(51) Int. Cl.
*G06Q 10/06* (2023.01)
*G06Q 10/0639* (2023.01)
(Continued)

(52) U.S. Cl.
CPC ....... *G06Q 10/06393* (2013.01); *G06F 40/40* (2020.01); *G06Q 10/06395* (2013.01);
(Continued)

(58) Field of Classification Search
None
See application file for complete search history.

(56) References Cited

U.S. PATENT DOCUMENTS

| 2015/0117632 | A1* | 4/2015 | Konig | H04M 3/5191 379/265.12 |
| 2019/0245973 | A1* | 8/2019 | Dwyer | G10L 15/02 |

(Continued)

FOREIGN PATENT DOCUMENTS

WO  WO-2021113798 A1 *  6/2021  ............. G06N 20/00

OTHER PUBLICATIONS

Neustein, A., 2004. Sequence Package Analysis: A New Natural Language Understanding Method for Performing Data Mining of Help-Line Calls and Doctor-Patient Interviews. In NLUCS (pp. 64-74) (Year: 2004).*

(Continued)

*Primary Examiner* — Chesiree A Walton
*Assistant Examiner* — Marjorie Pujols-Cruz
(74) *Attorney, Agent, or Firm* — SOROKER AGMON NORDMAN RIBA; Liat Lin; Sharone Godesh

(57) ABSTRACT

There is thus provided a computerized-method for calculating a Repeated-Information-Request (RIR) score of an interaction in a contact center, by which a related interaction-recording is filtered for evaluation. The computerized-method is operating in a computerized-system which includes a processor, a data-storage and a memory to store the data-storage. The processor is operating a RIR score calculation module. The operating of the RIR score calculation module includes: (i) retrieving from the data-storage an interaction-recording and an interaction-recording-length thereof; (ii) operating a module on the retrieved interaction-recording to count a number of requests to repeat information; (iii) calculating a RIR score according to the number of requests to repeat information and the interaction-recording-length; and (iv) storing the RIR score of the retrieved interaction-recording in the data-storage. The RIR score is sent to a platform by which the platform is preconfigured to distribute the interaction-recording for evaluation, based on the RIR score.

9 Claims, 5 Drawing Sheets

(51) Int. Cl.
*G06F 40/40* (2020.01)
*G06Q 30/016* (2023.01)
*H04M 3/50* (2006.01)

(52) U.S. Cl.
CPC ..... *G06Q 10/06398* (2013.01); *G06Q 30/016* (2013.01); *H04M 3/50* (2013.01)

(56) References Cited

U.S. PATENT DOCUMENTS

| | | | |
|---|---|---|---|
| 2021/0119878 A1* | 4/2021 | Loftus | H04L 41/065 |
| 2021/0201238 A1* | 7/2021 | Sekar | H04M 3/5191 |
| 2022/0046132 A1* | 2/2022 | Matula | H04M 3/5166 |

OTHER PUBLICATIONS

Karakus, B. and Aydin, G., May 2016. Call center performance evaluation using big data analytics. In 2016 International Symposium on Networks, Computers and Communications (ISNCC) (pp. 1-6). IEEE. (Year: 2016).*

* cited by examiner

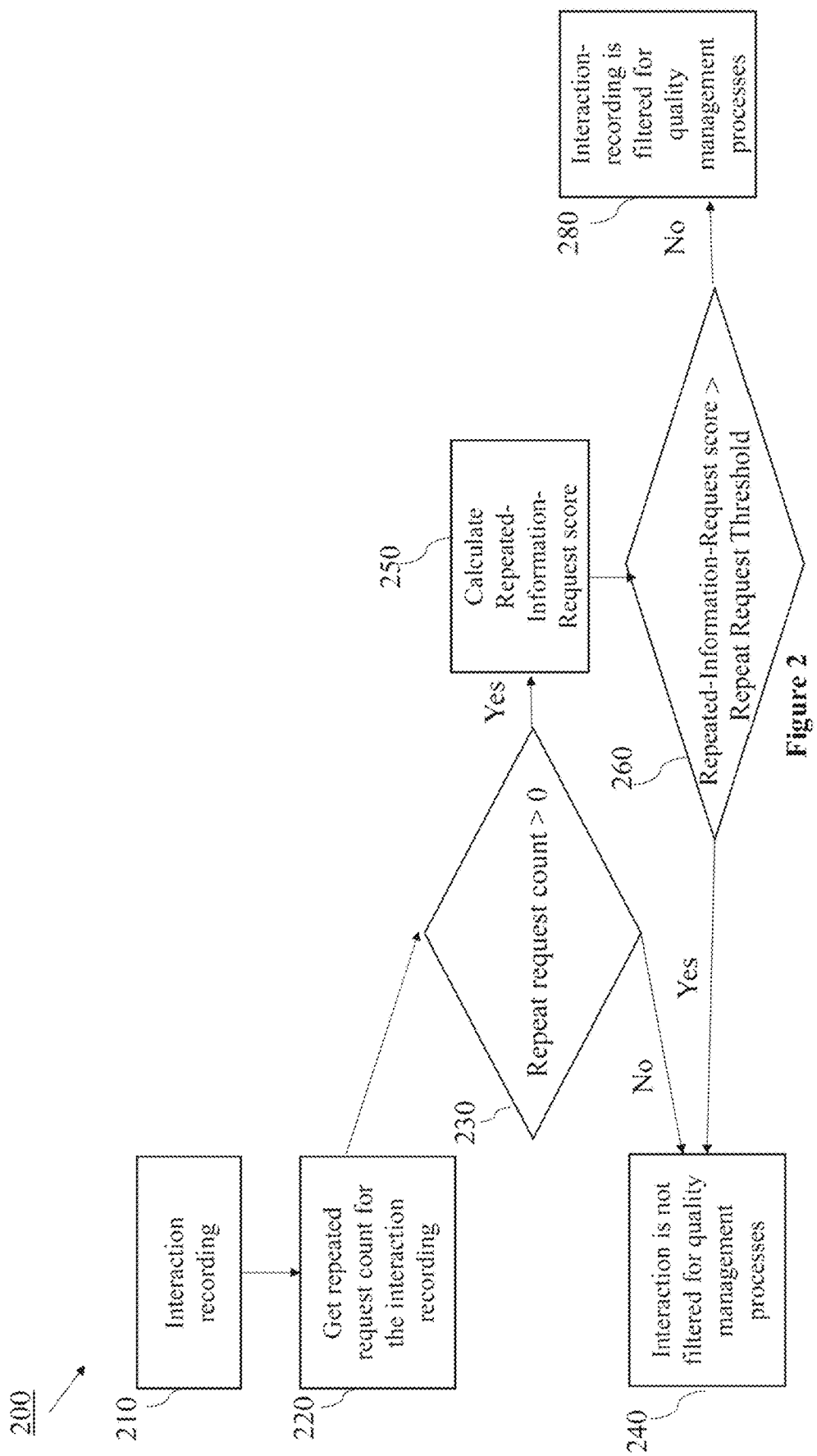

- Table 1 :- Calculating Repeat Request Threshold

| Media Type | Routing Skill | Interaction Length (in seconds) | # Repeat request | Repeat Request Count | Repeat Request Threshold |
|---|---|---|---|---|---|
| Audio | Credit card queries | [100, 200, 350, 230, 210] | | [1,2,3,4,2] | 90.833 |
| Audio | Account information | [120, 100, 110, 150, 160] | | [2,1,2,2,3] | 84 |

- Table 2 :- Filtering upcoming interactions based on 'Repeat Request Threshold'

| Media Type | Routing Skill | Interaction Length (in seconds) | # Repeat request | Interaction Repetition Score (IRS) | Inference |
|---|---|---|---|---|---|
| Audio | Credit card queries | 130 | 1 | 130 | 130 > 90.833, hence the interaction will not be filtered for repeated conversation. |
| Audio | Credit card queries | 200 | 3 | 66.667 | 66.667 < 90.833, hence the interaction will be filtered for repeated conversation |

Figure 4

SYSTEM AND METHOD FOR DETERMINING AND UTILIZING REPEATED CONVERSATIONS IN CONTACT CENTER QUALITY PROCESSES

TECHNICAL FIELD

The present disclosure relates to the field of data analysis to determine repeated information parts in interactions for quality process management purposes.

BACKGROUND

Current systems in contact centers monitor agents' interactions and record them for quality management processes. Moreover, current systems in contact centers, maintain a platform that is having quality management plans, which automatically receive recorded interactions for evaluation e.g., agents' performance, based on filters, e.g., business preferences. These systems further maintain automate alerts and distribution of the recorded interactions for evaluations, disputes, calibrations and coaching plans to improve agent's performance. A Key Performance Indicator (KPI) is a measurable value that demonstrates how effectively an organization is achieving key business objectives. For example, low-level KPIs may focus on processes in individual departments or teams.

One of the top contact center KPIs to measure success is Average Answer Time (AAT). AAT is the average time that an agent handles an interaction with a customer. The AAT may be impacted by repeated information parts during the interaction. Repetitions of parts of information, during an interaction may be a serious shortcoming that the contact center may want to proactively act upon and prevent.

Accordingly, there is a need to carefully review interactions which are having high volume of repetitions of requests for information, to detect deficiencies, such as agent shortcomings, for lack of skills or attentiveness, inefficient processes, outdated and suboptimal trainings and inefficient routing techniques and the like, which may need to be acknowledged and corrected.

Hence, there is a need for a technical solution for calculating a Repeated-Information-Request (RIR) score of an interaction in a contact center, by which a related interaction-recording is filtered for evaluation for due consideration and follow-on remedial measures.

Moreover, to identify areas for improvement of agent's performance and to detect interactions with high AAT, which increases the contact center's costs, there is a need for a technical solution that will provide a score, as to repeated information parts of each interaction which may be used for agent performance evaluation purposes.

SUMMARY

There is thus provided, in accordance with some embodiments of the present disclosure, a computerized-method for calculating a Repeated-Information-Request (RIR) score of an interaction in a contact center, by which a related interaction-recording is filtered for evaluation.

Furthermore, in accordance with some embodiments of the present disclosure, in a computerized system that includes a processor, a data storage of interaction-recordings between an agent and a customer and of metadata related to each interaction-recording, and a memory to store the data storage, the processor may be configured to operate a RIR score calculation module.

Furthermore, in accordance with some embodiments of the present disclosure, the operating of the RIR score calculation module may include: (i) retrieving from the data storage an interaction-recording and an interaction-recording-length thereof; (ii) operating a module on the retrieved interaction-recording to count a number of requests to repeat information; (iii) calculating a RIR score according to the number of requests to repeat information and the interaction-recording-length; and (iv) storing the RIR score of the retrieved interaction-recording in the data storage.

Furthermore, in accordance with some embodiments of the present disclosure, the RIR score may be sent to a platform by which the platform may be preconfigured to distribute the interaction-recording for evaluation, based on the RIR score. The distributed interaction-recording may assist an evaluator in effective evaluation of agent performance. The evaluation may lead to an effective and optimal training assignments and may save cost and enhance agent productivity.

Furthermore, in accordance with some embodiments of the present disclosure, the platform may be distributing the interaction-recording for evaluation, based on the RIR score by: comparing the calculated RIR score to a precalculated Repeat Request Threshold (RRT) to determine if the calculated RIR score is below the preconfigured RRT; when it is determined that the calculated RIR score is below the precalculated RRT, the platform may be distributing the interaction-recording for evaluation; and when it is determined that the calculated RIR score is not below the precalculated RRT, the platform may not be distributing the interaction-recording for evaluation.

Furthermore, in accordance with some embodiments of the present disclosure, the platform may be a quality planner microservice.

Furthermore, in accordance with some embodiments of the present disclosure, the RIR score may be calculated by dividing the interaction-recording-length by the counted number of requests to repeat information.

Furthermore, in accordance with some embodiments of the present disclosure, the RRT may be calculated by an aggregation of interaction-recording-length divided by a corresponding number of repeat requests of historical interactions.

Furthermore, in accordance with some embodiments of the present disclosure, the distributed interaction-recording for evaluation may be reviewed by an evaluator for due consideration and follow-on remedial measures to improve operational efficiency of the contact center and to improve customer satisfaction.

Furthermore, in accordance with some embodiments of the present disclosure, the due consideration may be selected from at least one of (i) identifying low level of performance of agents; and (ii) inefficient processes in the contact center.

Furthermore, in accordance with some embodiments of the present disclosure, the follow-on remedial measures may be selected from at least one of: (i) assigning the agent to a coaching plan based on the identified low level of performance; and (ii) optimizing processes in the contact center.

Furthermore, in accordance with some embodiments of the present disclosure, the operating of the RIR score calculation module may be performed per media type of the interaction-recording and per agent routing skill.

Furthermore, in accordance with some embodiments of the present disclosure, the media type may be related to a communication channel by which an interaction related to the interaction-recording has been conducted. The communication channel may be selected from at least one of: audio call, video call, chat and email.

Furthermore, in accordance with some embodiments of the present disclosure, the operated module on the retrieved interaction-recording to count a number of requests to repeat information may be a Natural Language Understanding (NLU) module based on a transcript of the interaction-recording.

There is further provided, in accordance with some embodiments of the present disclosure, a computerized-system for calculating a Repeated-Information-Request (RIR) score of an interaction in a contact center, by which a related interaction-recording is filtered for evaluation.

Furthermore, in accordance with some embodiments of the present disclosure, the computerized-system may include a processor; a data storage of interaction-recordings between an agent and a customer and of metadata related to each interaction-recording and a memory to store the data storage.

Furthermore, in accordance with some embodiments of the present disclosure, the processor may be configured to operate, a Repeated-Information-Request (RIR) score calculation module.

Furthermore, in accordance with some embodiments of the present disclosure, the RIR score calculation module may be configured to: (i) retrieve from the data storage an interaction-recording and an interaction-recording-length thereof; (ii) operate a module on the retrieved interaction-recording to count a number of requests to repeat information; (iii) calculate a RIR score according to the number of requests to repeat information and the interaction-recording-length; and (iv) store the RIR score of the retrieved inter-action-recording in the data storage.

Furthermore, in accordance with some embodiments of the present disclosure, the operated module on the retrieved interaction-recording to count a number of requests to repeat information may be a Natural Language Understanding (NLU) module based on a transcript of the interaction-recording.

Furthermore, in accordance with some embodiments of the present disclosure, the RIR score may be sent to a platform by which the platform may be preconfigured to distribute the interaction-recording for evaluation, based on the RIR score.

BRIEF DESCRIPTION OF THE DRAWINGS

FIG. 2 schematically illustrates a high-level diagram of a computerized method for calculating a RIR score of an interaction in a contact center, in accordance with some embodiments of the present disclosure;

FIG. 4 schematically illustrates an example of a calculation of Repeat Request Threshold (RRT) and filtering of an interaction-recording upon the RRT, in accordance with some embodiments of the present disclosure.

DETAILED DESCRIPTION

Figure 1A:
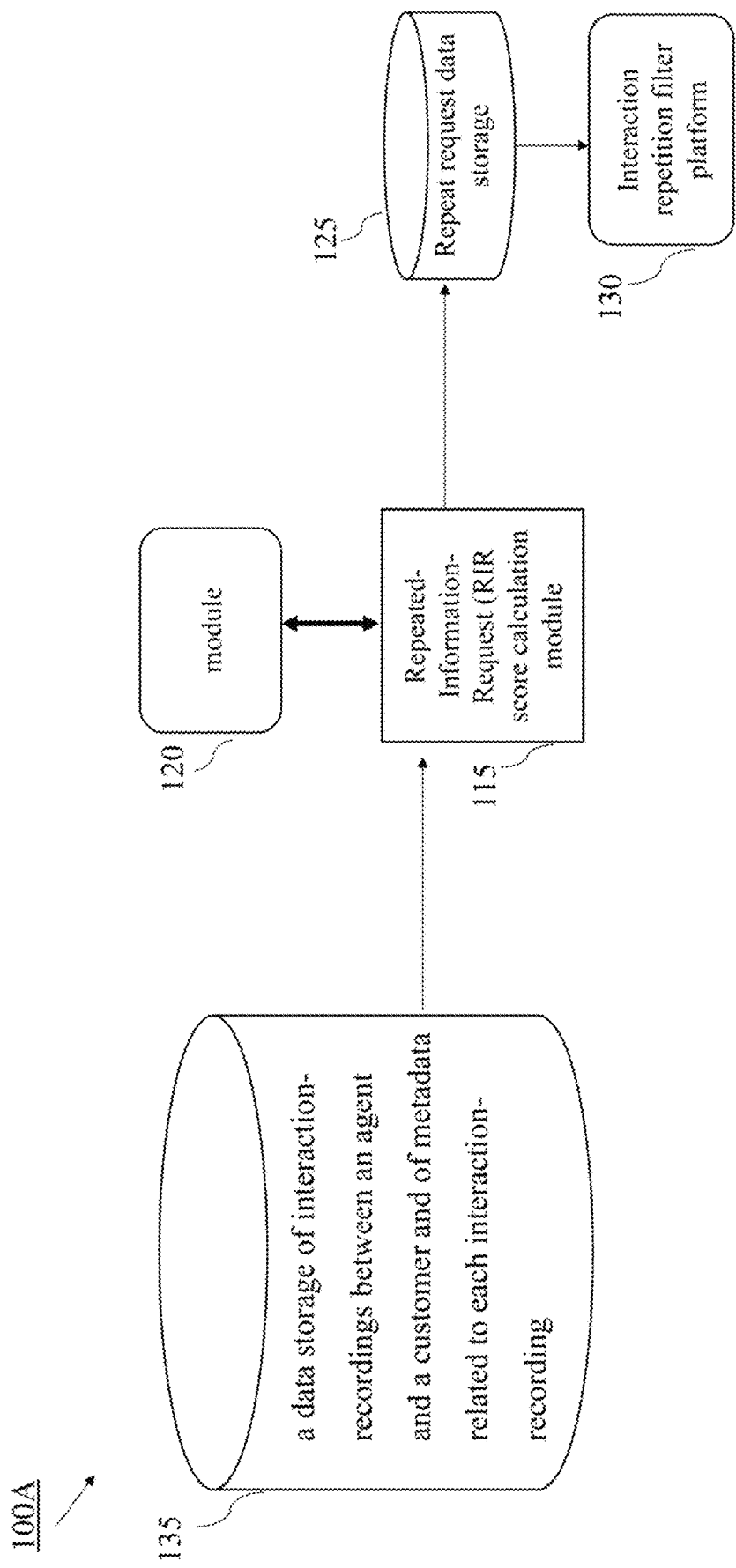
FIGS. 1A-1B schematically illustrate a high-level diagram of a computerized system for calculating a Repeated-Information-Request (RIR) score of an interaction in a contact center, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Commonly, contact centers measure success according to Key Performance Indicators (KPIs). One of the top contact center KPIs to measure success is Average Answer Time (AAT). AAT is the average time that an agent handles an interaction with a customer which may be impacted by repeated information parts during the interaction.

Contact centers constantly monitor interactions between customers and agents for later evaluation. The purpose of the evaluation is to identify low level performance of the agents and inefficient processes in the contact center. Accordingly, training and coaching programs may be tailored to the agents to enhance their performance or alternatively the identified inefficient processes may be amended.

For example, an area for improvement, that is currently overlooked, but every contact center should be proactively acting upon, is a number of repetitions during an interaction. This means carefully reviewing an interaction with several repetitions to detect agent shortcomings, inefficient processes, outdated and suboptimal trainings and inefficient routing techniques and the like, which accordingly should be corrected.

Hence, there is a need for a solution which can identify and compare such repeated conversations against a derived threshold, based on interaction characteristics and flag them to the evaluator for due consideration and follow-on remedial measures.

The needed technical solution should provide a focus on repeated conversations, or repeated parts in conversations, by which agents may be trained so they may gain control over the way they communicate with the customers and change it for the better. This may also result in an improved AAT, reduced language complexity and shift towards more stable interactions. These three components, time, ease of communication and stability are the pillars of customer satisfaction.

FIG. 1A schematically illustrates a high-level diagram of a computerized system 100A for calculating a Repeated-Information-Request (RIR) score of an interaction in a contact center, in accordance with some embodiments of the present disclosure.

According to some embodiments of the present disclosure, in a computerized system, such as computerized-system 100A which includes a processor (not shown), a data storage of interaction-recordings between an agent and a customer and of metadata related to each interaction-recording, such as data storage of interaction-recordings between an agent and a customer and of metadata related to each interaction-recording 135, which is associated to recording applications and analytics applications, and a memory (not shown) to store the data storage, the processor may be configured to operate a Repeated-Information-Request (RIR) score calculation module.

Figure 3:
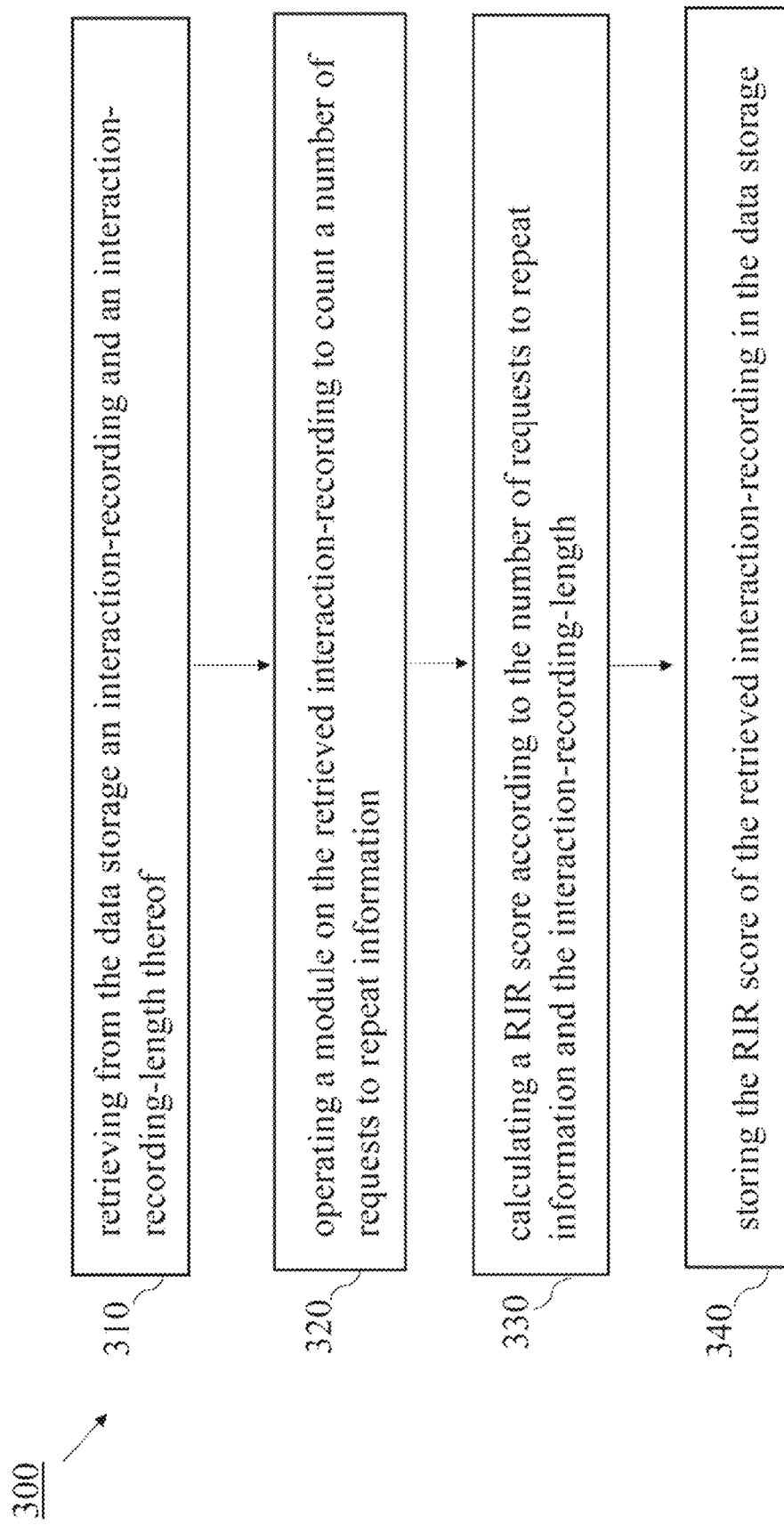
FIG. 3 is a high-level workflow of a Repeated-Information-Request (RIR) score calculation module, by which a related recording may be filtered for evaluation, in accordance with some embodiments of the present disclosure.

According to some embodiments of the present disclosure, The Repeated-Information-Request (RIR) score calculation module, such as RIR score calculation module 115 and such as RIR score calculation module 300 in FIG. 3 may take into consideration various data points related to a recorded interaction. This includes interaction metadata, such as interaction identifier, interaction characteristics e.g., call type, routing skill and duration of the interaction, and an interaction transcript.

According to some embodiments of the present disclosure, the recording applications may provide to the contact center recording services of interactions between a customer and an agent. The recording applications may store the interaction-recordings in a data storage, such as data storage of interaction-recordings between an agent and a customer and of metadata related to each interaction-recording 135. The analytics applications may provide an analysis of the recorded interactions, such as duration and transcript of the interaction, which may be stored in a data storage, such as data storage of interaction-recordings between an agent and a customer and of metadata related to each interaction-recording 135.

According to some embodiments of the present disclosure, the RIR score calculation module, such as RIR score calculation module 115 and such as RIR score calculation module 300 in FIG. 3, may retrieve from the data storage of interaction-recordings between an agent and a customer and of metadata related to each interaction-recording 135, an interaction-recording and its related interaction duration, i.e., interaction-recording-length.

According to some embodiments of the present disclosure, the RIR score calculation module, such as RIR score calculation module 115 and such as RIR score calculation module 300 in FIG. 3, may operate a module, such as module 120 on the retrieved interaction-recording to count a number of requests to repeat information.

According to some embodiments of the present disclosure, the RIR score calculation module, such as RIR score calculation module 115 and such as RIR score calculation module 300 in FIG. 3, may calculate a RIR score according to the number of requests to repeat information and the interaction-recording-length which may be stored in a data storage, such as repeat request data storage 125.

According to some embodiments of the present disclosure, the RIR score may be sent to a platform, such as interaction repetition filter platform 130, by which the platform may be preconfigured to distribute the interaction-recording for evaluation, based on the RIR score.

Figure 1B:
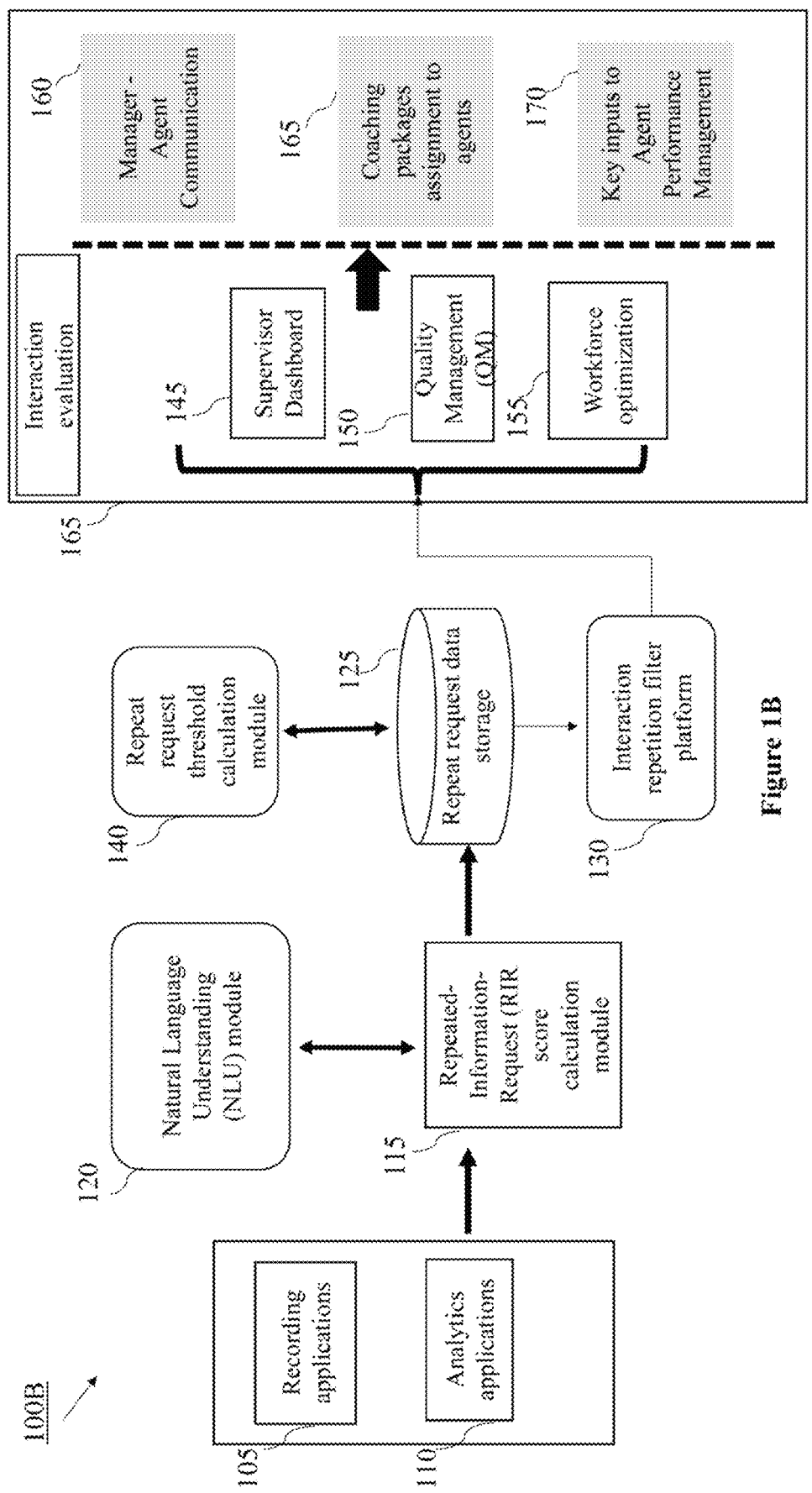

FIG. 1B schematically illustrates a high-level diagram of a computerized system 100B for calculating a Repeated-Information-Request (RIR) score of an interaction in a contact center, in accordance with some embodiments of the present disclosure.

According to some embodiments of the present disclosure, in a computerized system, such as computerized system 100B, recording applications, such as recording applications 105 and analytics applications, such as analytics applications 110 may store interaction-recordings between an agent and a customer and metadata related to each interaction recording respectively in a data storage, such as data storage of interaction-recordings between an agent and a customer and of metadata related to each interaction-recording 135 in FIG. 1A.

According to some embodiments of the present disclosure, a RIR score calculation module, such as RIR score calculation module 115 and such as RIR score calculation module 300 in FIG. 3, may retrieve from the data storage, such as data storage of interaction-recordings between an agent and a customer and of metadata related to each interaction-recording 135 in FIG. 1A, an interaction-recording and duration, i.e., interaction-recording-length.

According to some embodiments of the present disclosure, the operating of the RIR score calculation module such as RIR score calculation module 115 and such as RIR score calculation module 300 in FIG. 3, may be performed per media type of the interaction-recording and per agent routing skill. The media type may be related to a communication channel by which an interaction related to the interaction-recording has been conducted and the communication channel may be selected from at least one of: audio call, video call, chat and email.

According to some embodiments of the present disclosure, the RIR score calculation module, such as RIR score calculation module 115 and such as RIR score calculation module 300 in FIG. 3, may operate a module, such as Natural Language Understanding (NLU) module 120 on the retrieved interaction-recording to count a number of requests to repeat information, during the interaction, based on a transcript of the interaction-recording. Intent classification technique of NLU may be used to identify the requests to repeat the information, i.e., repeat request count or the number of requests to repeat information.

According to some embodiments of the present disclosure, a pretrained model may be used to classify statements in the transcript of the interaction-recording with a repetition intent. For example, statements such as 'Can you please repeat?', 'Will you repeat please?', 'Can you come back again?', 'I didn't understand what you explained', and the like may be used for training such as classification model.

According to some embodiments of the present disclosure, text segments from the interaction transcript may be fed into the NLU module. Based on the confidence score derived from the NLU module, the corresponding text segments may be classified as a "Request to repeat" or not. The number of text segments that are classified as "Request to repeat" for a given interaction may be the repeat request count or number of requests to repeat information.

According to some embodiments of the present disclosure, the RRT may define the permissible number of requests to repeat information for a given interaction-recording duration. The RRT may be calculated against interaction characteristics, such as routing skills for an interaction and corresponding media type. It calculation of the RRT may also ensure that the complexity of interaction is appropriately considered by calculating it separately for interactions with different characteristics, as shown in example 400 in FIG. 4.

According to some embodiments of the present disclosure, the RRT may be a point estimate i.e., average, that may be calculated utilizing the historical interactions based on the interaction length against the 'Repeat Request Count', i.e. the number of requests to repeat information.

According to some embodiments of the present disclosure, the Repeat Request Threshold (RRT) may be calculated by using the following equation I:

$$RRT = \sum_{i=1}^{n} \frac{Li}{Ri} \quad (1)$$

whereby:
n is a total number of historical interactions,
Li is a length of an interaction-recording, and
Ri is 'repeat request count' of the interaction.

According to some embodiments of the present disclosure, the transcript of the interaction-recording may be provided by an analytics application from analytics applications 110.

According to some embodiments of the present disclosure, the RIR score calculation module, such as RIR score calculation module 115 and such as RIR score calculation module 300 in FIG. 3, may calculate a RIR score according to the number of requests to repeat information and the interaction-recording-length which may be stored in a data storage, such as repeat request data storage 125.

According to some embodiments of the present disclosure, the RIR score may be calculated by dividing the interaction-recording-length by the counted number of requests to repeat information.

According to some embodiments of the present disclosure, the RIR score may be sent to a platform, such as interaction repetition fiber platform 130, by which the platform is preconfigured to distribute the interaction-recording for evaluation, based on the RIR score. The platform may be a quality planner microservice.

According to some embodiments of the present disclosure, the platform, such as interaction repetition filter platform 130, may be distributing the interaction-recording for evaluation, i.e., interaction evaluation 165, based on the RIR score, by comparing the calculated RIR score to a precalculated Repeat Request Threshold (RRT) to determine if the calculated RIR score is below the preconfigured RRT.

According to some embodiments of the present disclosure, the RRT may be calculated by an aggregation of interaction-recording-length divided by corresponding number of repeat requests of historical interactions. The interaction complexity may be taken into consideration while calculating the RRT by calculating it separately for interactions with different characteristics.

According to some embodiments of the present disclosure, when it is determined that the calculated RIR score is below the precalculated RRT, the platform may be distributing the interaction-recording for evaluation, i.e., interaction evaluation 165. When it is determined that the calculated RIR score is not below the precalculated RRT, the platform may not distribute the interaction-recording for evaluation.

According to some embodiments of the present disclosure, the distributed interaction-recording for evaluation may be reviewed by an evaluator for due consideration and follow-on remedial measures to improve operational efficiency of the contact center and to improve customer satisfaction. The due consideration may be selected from at least one of: (i) identifying low level of performance of agents; and (ii) inefficient processes in the contact center.

According to some embodiments of the present disclosure, such interactions which the platform, such as repetition filter platform 130, has been flagged for evaluation, will be distributed to downstream applications, such as Quality Management (QM) 150, workforce optimization 155 and also may provide significant pointers for a supervisor dashboard 145.

According to some embodiments of the present disclosure, based on these indicators and conclusions of the operators of applications, such as QM 155 and workforce optimization 155, subsequent action points, such as manager-agent communication 160, coaching packages assignment to agents 165, and key inputs to agent performance management 170, may be initiated.

According to some embodiments of the present disclosure, such action points, i.e., corrective measures may lead to improved agent performance hence improved contact center efficiency and improved customer satisfaction.

FIG. 2 schematically illustrates a high-level diagram of a computerized method 200 for calculating a RIR score of an interaction in a contact center, in accordance with some embodiments of the present disclosure.

According to some embodiments of the present disclosure, in a computerized system comprising a processor, a data storage of interaction-recordings between an agent and a customer and of metadata related to each interaction-recording, such as data storage of interaction-recordings between an agent and a customer and of metadata related to each interaction-recording 135 in FIG. 1A and a memory (not shown) to store the data storage, the processor may be configured to operate a Repeated-Information-Request (RIR) score calculation module, such as RIR score calculation module 115 in FIGS. 1A-1B and such as RIR score calculation module 300 in FIG. 3.

According to some embodiments of the present disclosure, the RIR score calculation module, such as RIR score calculation module 115 in FIGS. 1A-1B and such as RIR score calculation module 300 in FIG. 3 may be retrieving from the data storage an interaction-recording 210 and the interaction's duration i.e., an interaction-recording-length. The data storage may be data storage of interaction-recordings between an agent and a customer and of metadata related to each interaction-recording 135 in FIG. 1A.

According to some embodiments of the present disclosure, the RIR score calculation module, such as RIR score calculation module 115 in FIGS. 1A-1B and such as RIR score calculation module 300 in FIG. 3 may get repeated request count for the interaction recording 220.

According to some embodiments of the present disclosure, the RIR score calculation module, such as RIR score calculation module 115 in FIGS. 1A-1B and such as RIR score calculation module 300 in FIG. 3 may be checking 230 if repeat request count is greater than zero. If it is not greater than zero, then the interaction-recording 210 may not be filtered for quality management processes.

According to some embodiments of the present disclosure, if repeat request count is greater than zero, then the RIR score calculation module, such as RIR score calculation module 115 in FIGS. 1A-1B and such as RIR score calculation module 300 in FIG. 3 may be calculating repeated information request score 250 for the interaction-recording 210.

According to some embodiments of the present disclosure, the RIR score calculation module, such as RIR score calculation module 115 in FIGS. 1A-1B and such as RIR score calculation module 300 in FIG. 3 may be checking 260 if the RIR score is greater than a Repeated Request Threshold (RRT) 260. If it is greater than the RRT, then the interaction-recording may not be filtered for quality management processes 240.

According to some embodiments of the present disclosure, if the RIR score is not greater than the RRT then the interaction-recording may be filtered for interaction evaluation, such as interaction evaluation 165 in FIG. 1B, which includes quality management processes 280.

FIG. 3 is a high-level workflow of a Repeated-Information-Request (RIR) score calculation module 300, by which a related interaction-recording may be filtered for evaluation, in accordance with some embodiments of the present disclosure.

According to some embodiments of the present disclosure, operation 310 may comprise retrieving from the data storage an interaction-recording and an interaction-recording-length thereof. The data storage may be data storage of interaction-recordings between an agent and a customer and of metadata related to each interaction-recording 135 in FIG. 1A.

According to some embodiments of the present disclosure, operation 320 may comprise operating a module on the retrieved interaction-recording to count a number of requests to repeat information. The operated module on the retrieved interaction-recording to count a number of requests to repeat information may be a Natural Language Understanding (NLU) module based on a transcript of the interaction-recording.

According to some embodiments of the present disclosure, operation 330 may comprise calculating a RIR score according to the number of requests to repeat information and the interaction-recording-length. The interaction-recording-length may be the duration of the interaction which may be provided by an analytics application, such as analytics applications 110 in FIG. 1B or may be stored by the analytics application as metadata of the interaction-recording in a data storage, such as data storage of interaction-recordings between an agent and a customer and of metadata related to each interaction-recording 135 in FIG. 1A.

According to some embodiments of the present disclosure, operation 340 may comprise storing the RIR score of the retrieved interaction-recording in the data storage, such as data storage of interaction-recordings between an agent and a customer and of metadata related to each interaction-recording 135 in FIG. 1A.

According to some embodiments of the present disclosure, the RIR score may be sent to a platform, such as interaction repetition filter platform 130 in FIGS. 1A-1B, by which the platform is preconfigured to distribute the interaction-recording for evaluation, such as interaction evaluation 165 in FIG. 1B, based on the RIR score.

FIG. 4 schematically illustrates an example 400 of a calculation of Repeat Request Threshold (RRT) and filtering of an interaction-recording upon the RRT, in accordance with some embodiments of the present disclosure.

According to some embodiments of the present disclosure, in example 400 there is a table of a calculation of Repeat Request Threshold (RRT) 410 and a table of filtering of an interaction-recording upon the RRT 425.

According to some embodiments of the present disclosure, in the table of a calculation of RRT 410 there are two examples of interactions-recordings of media type that is audio. The first example 415 is of audio interactions that require a routing skill of credit card queries. There are five such audio interactions having the following length in seconds: '100', '200', '350', '230' and '210'. For each interaction a 'repeat request count' i.e. number of requests to repeat information, has been calculated, '1', '2', '3', '4', '2', respectively. According to equation I for calculating the RRT above, the RRT for the five audio interactions is '90.833'. The second example 420 is of audio interactions that require account information. There are five such audio interactions having the following length in seconds: '120', '100', '110', '150' and '160'. For each interaction a 'repeat request count' i.e. number of requests to repeat information, has been calculated, '2', '1', '2', '2', '3', respectively. According to equation I for calculating the RRT above, the RRT for the five audio interactions is '64'.

According to some embodiments of the present disclosure, in the table of filtering of an interaction-recording upon the RRT 425 there are two examples of audio interactions which require a routing skill of credit card queries 430 and 435. The first example 430 is an audio interaction with a duration of '130' seconds and repeat request count of '1'. Since the calculated RIR, by a Repeated-Information-Request (RIR) score calculation module, such as RIR score calculation module 115 and such as RIR score calculation module 300 in FIG. 3 is '130' and the RRT for audio interactions which require routing skills of credit card queries is '90.833', as shown in table 410 in example 410, the interaction will not be filtered for evaluation as interaction evaluation 165 in FIG. 1B. The second example 435 is an audio interaction with a duration of '200' seconds and repeat request count of '3'. Since the calculated RIR, by a RIR score calculation module, such as RIR score calculation module 115 and such as RIR score calculation module 300 in FIG. 3 is '66.667' and the calculated RRT for audio interactions which require routing skills of credit card queries is '90.833', as shown in table 410 in example 410, the interaction will be filtered for evaluation as interaction evaluation 165 in FIG. 1B, because '66.667' is below '90.833', which is the calculated RRT for the media type and routing skill.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed is:

1. A computerized-method for calculating a Repeated-Information-Request (RIR) score of an interaction in a contact center, by which a related interaction-recording is filtered for evaluation, the computerized-method comprising:

in a computerized system comprising a processor, a data storage of interaction-recordings between an agent and a customer and of metadata related to each interaction-recording, and a memory to store the data storage, said processor is configured to:

train a Natural Language Understanding (NLU) module to classify statements in the interaction-recording with a repetition intent as "request to repeat" and "not a request to repeat", wherein a repetition intent is a request to repeat information during the interaction-recording:

operate a Repeated-Information-Request (RIR) score calculation module, said operating of the RIR score calculation module comprising:

(i) retrieving from the data storage an interaction-recording and an interaction-recording-length thereof;

(ii) using the trained NLU module on a transcript of the retrieved interaction-recording to: a. classify statements as "request to repeat" and "not a request to repeat"; and b. count a number of statements that were classified as "request to repeat";

(iii) calculating a RIR score according to the number of statements that were classified as "request to repeat" by the agent and the interaction-recording-length; and (iv) storing the RIR score of the retrieved interaction-recording in the data storage, wherein the RIR score is sent to an interaction repetition filter platform by which the interaction repetition filter platform is preconfigured to distribute the interaction-recording based on the RIR score, for evaluation to one or more downstream applications, and wherein the distributed interaction-recording for evaluation is reviewed by an evaluator for due consideration and follow-on remedial measures to improve operational efficiency of the contact center and to improve customer satisfaction, wherein the due consideration is, selected from at least one of: (i) identifying low level of performance of agents; and (ii) inefficient processes in the contact center, and wherein the follow-on remedial measures are selected from at least one of: (i) assigning the agent to a coaching plan based on the identified low level of performance: and (ii) optimizing processes in the contact center, wherein the interaction repetition filter platform is distributing the interaction-recording based on the RIR score for evaluation to one or more downstream applications, by:

comparing the calculated RIR score to a precalculated Repeat Request Threshold (RRT) to determine if the calculated RIR score is below the precalculated RRT;

when it is determined that the calculated RIR score is below the precalculated RRT, distributing the interaction-recording for evaluation: and when it is determined that the calculated RIR score is not below the precalculated RRT, the interaction-recording is not distributed for evaluation.

2. The computerized-method of claim 1, wherein the downstream application is at least one of: (i) quality planner microservice; (ii) workforce optimization; and (iii) supervisor dashboard.

3. The computerized-method of claim 1, wherein the RIR score is calculated by dividing the interaction-recording-length by the counted number of requests to repeat information.

4. The computerized-method of claim 1, wherein the RRT is an average. of an aggregation of an interaction-recording-length divided by a corresponding number of repeat requests of historical interactions.

5. The computerized-method of claim 1, wherein the operating of the RIR score calculation module is performed per media type of the interaction-recording and per agent routing skill.

6. The computerized-method of claim 5, wherein the media type is related to a communication channel by which an interaction related to the interaction-recording has been conducted.

7. The computerized-method of claim 6, wherein the communication channel is selected from at least one of: audio call, video call, chat and email.

8. A computerized-system for calculating a Repeated-Information-Request (RIR) score of an interaction in a contact center, by which a related interaction-recording is filtered for evaluation, the computerized-system comprising:

a processor:;

a data storage of interaction-recordings between an agent and a customer and of metadata related to each interaction-recording; and a memory to store the data storage, said processor is configured to:

train a Natural Language Understanding (NLU) module to classify statements in the interaction-recording with a repetition intent as "request to repeat" and "not a request to repeat"

wherein a repetition intent is a request to repeat information during the interaction-recording; and operate, a Repeated-Information-Request (RIR) score calculation module, said RIR score calculation module is configured to:

(i) retrieve from the data storage an interaction-recording and an interaction-recording-length thereof;

(ii) use the trained NLU module on a transcript of the retrieved interaction-recording to: a. classify statements as "request to repeat" and "not a request to repeat"; and b. count a number of statements that were classified as "request to repeat";

(iii) calculate a RIR score according to the number of statements that were classified as "request to repeat" and the interaction-recording-length; and (iv) store the RIR score of the retrieved interaction-recording in the data. storage, wherein the RIR score is sent to an interaction repetition filter platform by which the interaction repetition filter platform is preconfigured to distribute the interaction-recording based on the RIR score, for evaluation to one or more downstream applications, and wherein the distributed interaction-recording for evaluation is reviewed by an evaluator for due consideration and follow-on remedial measures to improve operational efficiency of the contact center and to improve customer satisfaction, wherein the due consideration is selected from at least one of: (i) identifying low level of performance of agents; and (ii) inefficient processes in the contact center, and wherein the follow-on remedial measures are selected from at least one of: (i) assigning the agent to a coaching plan based on the identified low level of performance; and (ii) optimizing processes in the contact center, wherein the interaction repetition filter platform is distributing the interaction-recording based on the RIR score for evaluation to one or more downstream applications, by:

comparing the calculated RIR score to a precalculated Repeat Request Threshold (RRT) to determine if the calculated MR score is below the RRT;

when it is determined that the calculated RIR score is below the precalculated RRT, distributing the interaction-recording for evaluation; and when it is determined that the calculated RIR score is not below the precalculated RRT, the interaction-recording is not distributed for evaluation.

9. The computerized-method of claim 1, wherein the RRT is calculated by using formula I:

$$RTT = \left(\sum_{i=1}^{n} \frac{Li}{Ri}\right)/n \tag{I}$$

whereby:
n is a total number of historical interactions,
Li is a length of an interaction-recording, and
Ri is 'repeat request count' of the interaction.

* * * * *